United States Patent
Rasinski et al.

(10) Patent No.: US 9,593,775 B2
(45) Date of Patent: Mar. 14, 2017

(54) RADIAL LEAD SEAL ASSEMBLY FOR A GENERATOR AND A RADIAL LEAD SEAL ASSEMBLY OF A GENERATOR

(71) Applicant: Siemens Energy, Inc., Orlando, FL (US)

(72) Inventors: Michael J. Rasinski, Winter Springs, FL (US); Robert Gore, Sorrento, FL (US); Randy Edward Whitener, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/799,985

(22) Filed: Jul. 15, 2015

(65) Prior Publication Data
US 2017/0018984 A1    Jan. 19, 2017

(51) Int. Cl.
F16J 15/06    (2006.01)
F16J 15/02    (2006.01)

(52) U.S. Cl.
CPC .................................. *F16J 15/021* (2013.01)

(58) Field of Classification Search
CPC   F16J 15/18; F16J 15/181; F16J 15/182; F16J 15/183
See application file for complete search history.

(56) References Cited

U.S. PATENT DOCUMENTS

| | | | | |
|---|---|---|---|---|
| 4,515,213 A | * | 5/1985 | Rogen | E21B 33/1212 166/123 |
| 5,056,758 A | * | 10/1991 | Bramblet | F16J 15/182 251/214 |
| 5,129,625 A | * | 7/1992 | Wood | F16J 15/186 137/553 |
| 5,131,666 A | * | 7/1992 | Hutchens | F16K 41/02 251/214 |
| 5,190,264 A | * | 3/1993 | Boger | F16K 41/04 251/214 |
| 5,230,498 A | * | 7/1993 | Wood | F16J 15/186 137/553 |
| 5,593,166 A | * | 1/1997 | Lovell | F16J 15/18 277/516 |

(Continued)

OTHER PUBLICATIONS

PCT International Search Report and Written Opinion mailed Oct. 5, 2016 corresponding to PCT Application No. PCT/US2016/038693 filed Jun. 22, 2016 (11 pages).

*Primary Examiner* — Gilbert Lee

(57) ABSTRACT

A retrofit method for modifying a radial lead seal assembly of a generator and a radial lead seal assembly of a generator are presented. The radial lead seal assembly seals a radial chamber from an axial chamber. The radial lead seal assembly includes sealing elements disposed around a radial lead to seal an annular space between the radial lead and the radial chamber, a coil spring disposed around the radial lead between the sealing elements and a junction between the radial lead and the axial lead, and a nut. The retrofit method includes removing one or more of the sealing elements to define a radial space between the remainder of the sealing elements and the coil spring. Conical springs are inserted in the radial space and only partially compressed under a radially inward compressive load exerted on the radial lead seal assembly via the nut.

16 Claims, 3 Drawing Sheets

(56) References Cited

U.S. PATENT DOCUMENTS

| | | | |
|---|---|---|---|
| 5,791,629 A * | 8/1998 | Wears | F16K 41/02 |
| | | | 251/214 |
| 6,236,128 B1 | 5/2001 | Dragash, Jr. | |
| 6,501,201 B1 | 12/2002 | Whitener et al. | |
| 2011/0148231 A1 | 6/2011 | Whitener et al. | |

* cited by examiner

RADIAL LEAD SEAL ASSEMBLY FOR A GENERATOR AND A RADIAL LEAD SEAL ASSEMBLY OF A GENERATOR

FIELD

Aspects of the present invention relate to generators, and in particular to a radial lead seal assembly in a generator.

DESCRIPTION OF RELATED ART

An electrical generator comprises a lead assembly to provide a field current from an excitation source to a rotor winding. The lead assembly comprises an axial lead and a radial lead. The axial lead extends within an axial chamber through a rotor. The radial lead extends radially outward from the axial lead through a radial chamber toward an outer diameter of a rotor of the generator.

For generators used in nuclear power plants, the outer diameter of the rotor may be subject to gas, typically hydrogen gas. Any leakage at the radial lead may allow the pressurized hydrogen gas to leak into the axial lead chamber of the rotor. The leakage may be communicated from the axial lead chamber into an excitation system and atmosphere. This hydrogen gas loss from the generator may require operations to maintain a proper operating pressure of the generator and may create a potential hazardous condition if sufficient accumulation occurs.

A radial lead seal assembly is used in a generator to fluidically seal the radial chamber from the axial chamber. A radial lead seal assembly may include seal elements around the radial lead to seal an annular space between the radial lead and the radial chamber. A currently used design is to spring load the radial lead assembly with a coil spring to compensate material creep and relaxation of the seal elements after assembly and operation.

The use of a coil spring is intended to keep the radial lead assembly under load after relaxation due to seal material creep and compression set. The coil spring design, however, does not have a resisting force applied by a spanner nut torque and therefore bottoms out under a small fraction of full spanner nut torque. With a small amount of relaxation, a large amount of the assembly force is lost. Because of the weak load of the coil spring, the assembly load increases from an added centrifugal force of the coil spring at operating speed of the generator. This may result in a cycling of load on the radial lead assembly from standstill to operating speed of almost 50% higher when operating than at standstill. As a consequence, the radial lead assembly may become under loaded at standstill and leak.

An improved radial lead seal assembly may require replacing the coil spring. However, due to the assembly's limited access and a height of the coil spring physical exceeding an available space for removal, a removal of the coil spring in an existing radial lead seal assembly may involve partial removal of winding component of the generator to provide the required accessibility to remove the coil spring, which entails increased effort and cost on the field.

SUMMARY

Briefly described, aspects of the present invention relate to a retrofit method for modifying a radial lead seal assembly of a generator and a radial lead seal assembly of a generator.

According to an aspect, a retrofit method is presented for modifying a radial lead seal assembly of a generator. The generator comprises a lead assembly for conducting a field current to a rotor winding. The lead assembly comprises an axial lead extending within an axial chamber through the rotor and a radial lead extending radially outward from the axial lead through a radial chamber. The radial lead seal assembly fluidically seals the radial chamber from the axial chamber. The radial lead seal assembly comprises a plurality of annular sealing elements disposed around the radial lead so as to seal an annular space between the radial lead and the radial chamber, a coil spring disposed annularly around the radial lead between the plurality of sealing elements and a junction between the radial lead and the axial lead, and a loading member. The retrofit method comprises removing one or more of the annular sealing elements to define a radial space between the remainder of the sealing elements and the coil spring. A plurality of conical springs is inserted in said radial space. A radially inward compressive load is applied on the radial lead seal assembly via the loading member such that the conical springs are only partially compressed.

According to another aspect, a radial lead seal assembly of a generator is presented. The generator comprises a lead assembly for conducting a field current to a rotor winding. The lead assembly comprises an axial lead extending within an axial chamber through the rotor and a radial lead extending radially outward from the axial lead through a radial chamber. The radial lead seal assembly comprises a plurality of annular sealing elements disposed around the radial lead to seal an annular space between the radial lead and the radial chamber and thereby seal the axial chamber fluidically from the radial chamber. A coil spring is disposed annularly around the radial lead between the plurality of sealing elements and a junction between the radial lead and the axial lead. A plurality of conical springs is disposed annularly around the radial lead in a radial gap between the plurality of sealing elements and the coil spring. The radial lead seal assembly comprises a loading member for exerting a compressive load on the radial lead seal assembly in a radially inward direction such that the conical springs are only partially compressed.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
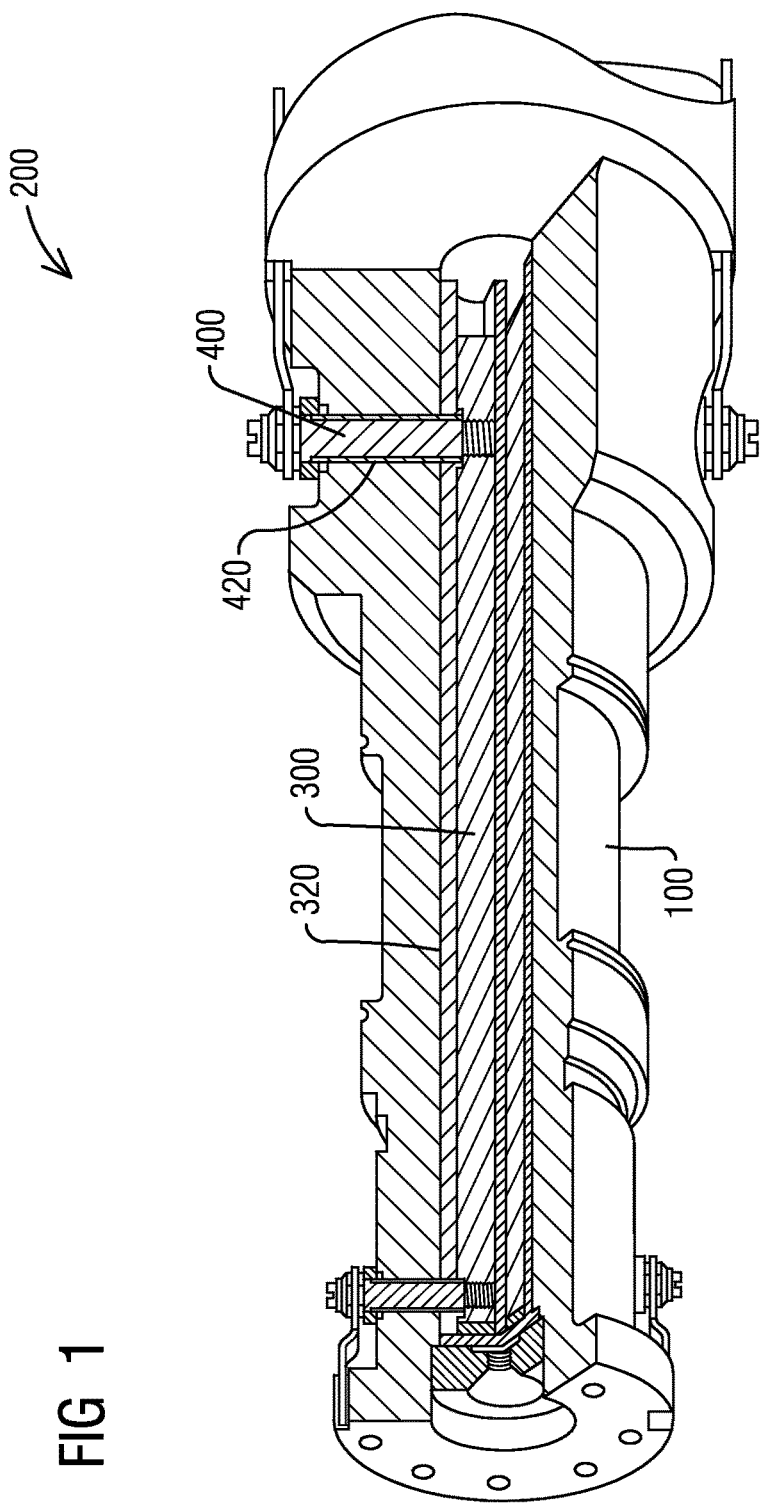
FIG. 1 illustrates a perspective cross section view of a lead assembly of a generator according to an embodiment.

FIG. 1 illustrates a perspective view of a lead assembly 200 of a generator according to an embodiment. According to the illustrated embodiment, the lead assembly 200 comprises an axial lead 300 extending in an axial direction of a rotor 100 of the generator and a radial lead 400 branching out radially outwardly from the axial lead 300. To this end, the rotor 100 is provided with an axial chamber 320 and a radial chamber 420 connected to and extending radially outward from the axial chamber 320. The axial lead 300 and the radial lead 400 are respectively positioned with the axial chamber 320 and the radial chamber 420 of the rotor 100. The lead assembly 200 is arranged to conduct a field current from an excitation source (not shown) via the axial lead 300 and the radial lead 400 to a radially outward located rotor winding (not shown).

An outer diameter of a rotor 100 may be in contact with a pressurized gas, such as hydrogen gas. Any gas leakage at the radial lead 400 may allow hydrogen gas to be lost by leaking into the axial lead chamber 320 of the rotor 100. The leakage may be communicated down through the axial lead chamber 320 into the excitation source and atmosphere. The hydrogen gas loss may require operations to maintain a proper operating pressure of the generator. The leakage may create a potential hazardous condition if sufficient accumulation occurs. A radial lead seal assembly is used to prevent the gas leakage at the radial lead 400, as described hereinafter.

Figure 2:
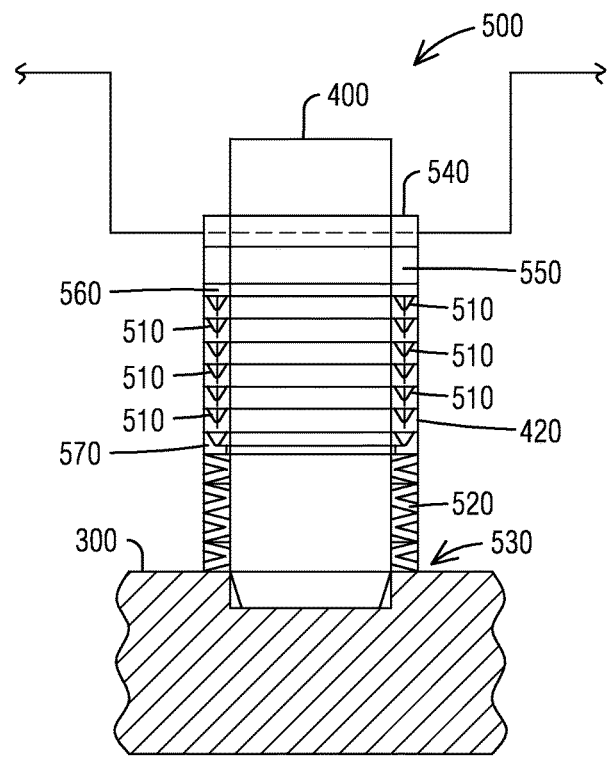
FIG. 2 illustrates a perspective view of an existing configuration of a radial lead seal assembly according to an embodiment.

FIG. 2 illustrates a perspective view of an assembly known type of a radial lead seal. As shown, the radial lead seal assembly 500 comprises a plurality of annular sealing elements 510. The annular sealing elements 510 are disposed around the radial lead 400 so as to seal an annular space between a radial lead 400 and a radial chamber 420. The annular sealing elements 510 may be made, for example of a material comprising neoprene rubber.

The radial lead seal assembly 500 shown in FIG. 2 comprises a coil spring 520 disposed annularly around the radial lead 400 between the plurality of sealing elements 510 and a junction 530 between the radial lead 400 and an axial lead 300. A nut 540 is engaged to a radially outer end of the radial lead 400. A torque is usually applied to the nut to exert a radially compressive load on the radial lead seal assembly 500. The radial lead seal assembly 500 may comprise a spacer 550 and a top washer 560 disposed annularly around the radial lead 400 between the nut 540 and the annular sealing elements 510. The radial lead seal assembly 500 may comprise a bottom washer 570 disposed annularly around the radial lead 400 between the annular sealing elements 510 and the coil spring 520.

The compressive load applied by the torque on the nut 540 may fully compress the coil spring 520. When fully compressed, the coil spring 520 exerts a predetermined compressive load on the sealing elements 510, which cannot be changed or removed on the field due to space constraints. The fully compressed travel of the coil spring 520 required for this compressive load controls an amount of relaxation of the radial lead seal assembly 500 due to creep that may be accommodated with some degree of retained loading by the coil spring 520. The fully compressed travel of the coil spring 520 is not adjustable.

In the radial lead seal assembly 500 shown in FIG. 2, the coil spring 520 does not have the resisting force to balance the compressive load applied by the torque on the nut 540. For example, the coil spring 520 may be compressed to its maximum extent (i.e. bottoms out) under only a fraction of the full torque applied on the nut 540. As a consequence, the configuration shown in FIG. 2 cannot maintain sufficient compressive loading to the radial lead seal assembly 500 over a period of operation due to material creep of seal elements 510 with thermal and compression set. Because of a weak loading of the coil spring 520, a loading on the radial lead seal assembly 500 may increase from an added centrifugal force of the coil spring 520 at operating speed of the generator. This may result in a cycling of load on the radial lead assembly 500 from standstill to operating speed of almost 50% higher when operating than at standstill. As a result, the radial lead seal assembly 500 may become under loaded at standstill and leak.

A solution to improve a performance of an existing configuration of a radial lead seal assembly 500 would be to replace the coil spring 520 with an improved method of load retention. However, because of available space constraints, removal of the coil spring 520 would involve partial removal of a winding component of the generator to provide the required accessibility. Replacing the coil spring 520 in the existing configuration of the radial lead seal assembly 500 would therefore create costly forced and maintenance outages with poor customer satisfaction. In an example, the height of a coil spring 520 in a radial lead seal assembly 500 is about 2.2" in the radial direction. In this example, the available removal distance for repairing a radial lead seal assembly 500 would be about 1.7". The current solution to address a gas leakage issue through a radial lead assembly 500 is to replace the radial lead assembly 500 only without any modification to improve a performance of the radial lead seal assembly 500.

Figure 3:
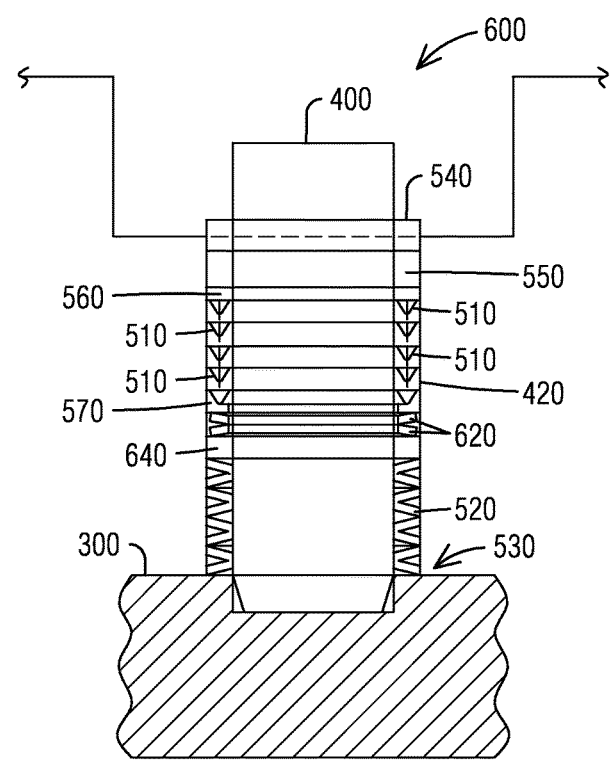
FIG. 3 illustrates a perspective view of a modified configuration of a radial lead seal assembly according to an embodiment.

FIG. 3 illustrates a perspective view of a modified configuration of a radial lead seal assembly 600 according to an embodiment of the invention. The modified configuration of a radial lead seal assembly 600 shown in FIG. 3 provides an improved sealing performance in relation to the existing configuration of a radial lead seal assembly 500 shown in FIG. 2. This is achieved by providing one or more conical springs 620 to augment the compressive force of the coil spring 510. As shown in FIG. 3, the conical springs 620 are arranged radially between the coil spring 520 and the sealing elements 510. The inventive configuration provides that under a compressive load from a loading member, which in this example is a nut 540, the conical springs 620 do not bottom out but are only partially compressed. This would provide a sufficient compressive loading on the radial lead seal assembly 600 to better compensate for the relaxation of the sealing elements 510 due to creep after a period of operation. Furthermore, a conical spring 620 may be replaced or adjusted without having to disassemble the rotor and/or windings. This makes it significantly simpler to adjust the compressive loading on the radial lead seal assembly 600 on the field, in comparison to the configuration described in FIG. 2.

According to one aspect of the invention, the modification may include an on field retrofit of the existing configuration described in FIG. 2. The modification does not involve replacing the coil spring 520 and hence may be implemented during field outages without major rotor component removal.

Referring to FIG. 3, a first step of the retrofit method comprises removing one or more of the annular sealing elements 510 from the existing configuration, to define a radial space between the coil spring 520 and the radially innermost sealing element 510. In an exemplary embodiment, the radial space is produced by removing two of the annular sealing elements 510. In a subsequent step, a plurality of conical springs 620 are inserted into the radial space. In the illustrated embodiment, two conical springs 620 are shown to be inserted into the radial space between the coil spring 520 and the remaining sealing elements 510. The number of conical springs 620 to be inserted, and correspondingly the number of sealing elements 510 removed to accommodate the same, may be adjusted on field, depending on an amount of compressive loading required.

In a subsequent step, a radially inward compressive load is applied to the radial lead seal assembly 600 via a loading member, which in this embodiment comprises a nut 540. The compressive load may be applied by exerting a torque on the nut 540, for example by a spanner. The radially inward compressive load applied to the radial lead seal assembly 600 may fully compresses the coil spring 520 but only partially compresses the conical springs 620. This would allow the conical springs 620 to depress a prescribed amount under the compressive load on the loading member 540 to achieve a total amount of deflection and load desired for the radial lead seal assembly 600. A relaxation of the radial lead seal assembly 600 will be recovered by an expansion of the conical springs 620 with only a small amount of force lost from the compressive load exerted on the loading member 540.

According to an embodiment, the partial compression of the conical springs 620 may be such as to provide enough travel remaining to account for thermal expansion of seal elements 510 without becoming fully compressed. According to an aspect of the invention, conical springs 620 in a radial lead seal assembly 600 remain in a partially compressed state during operation in order to regulate a mechanical pressure in the radial lead seal assembly 600 caused by centrifugal force and thermal expansion of seal elements 510 during operation. According to an aspect of the invention, conical springs 620 in a partially compressed state may provide a static and sustained loading on the radial lead seal assembly 600 at both standstill and speed of operation. The configuration of the modified radial lead seal assembly 600 may eliminate load loosening when at standstill. According to an embodiment, conical springs 620 in a radial lead seal assembly 600 may be only 50% compressed.

According to an embodiment as illustrated in FIG. 3, a transition spacer 640 is disposed annularly around the radial lead 400 between the coil spring 520 and the conical springs 620. The transition spacer 640 may provide an interface between the coil spring 520 and the conical springs 620 so that the compressive load is evenly applied to the radial lead seal assembly 600 to prevent damage of seal elements 510 caused by stress concentrations from uneven loading.

The dimension of a conical spring 620 in a modified configuration of a radial lead seal assembly 600 may be designed to meet loading and dimensional requirements of the radial lead seal assembly 600. A design feature of the conical spring 620 is that the conical spring 620 is not able to make contact with an insulated surface of a radial lead 400 at any time during assembly or operation. If this occurs, it is possible that the conical spring 620 may damage and/or remove a portion of the insulation of the radial lead 400 and may allow the radial lead 400 to become grounded to a rotor body. The conical spring 620 is designed such that a clearance from an outer diameter of the conical spring 620 to an inner diameter of a radial lead chamber 420 is smaller than that of a clearance from an inner diameter of the conical spring 620 to an outer diameter of the insulation of the radial lead 400. This configuration ensures that the conical spring 620 will not be able to contact with the insulated surface of the radial lead 400 at any time during assembly or operation.

Figure 4:
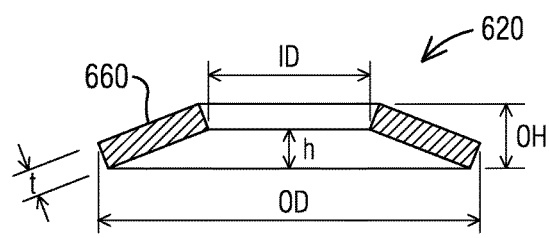
FIG. 4 illustrates a perspective view of a conical spring according to an embodiment.

FIG. 4 illustrates a perspective view of a conical spring 620 according to an embodiment. The conical spring 620 has an annular surface 660 with an inner diameter ID and an outer diameter OD. The annular surface 660 is conical, whereby the inner diameter ID and outer diameter OD are separated by an overall height OH of the conical spring 620. The inner diameter ID may be dimensioned to closely fit the diameter of the radial lead 400. As an example, the inner diameter may be in the range of 2.836" to 2.824" while the outer diameter OD may be in the range of 3.637" to 3.623".

In the radial lead seal assembly 600, the conical springs 620 may be stacked in different configurations. Stacking conical springs 620 in different configurations make it possible to adjust a partially compressed travel of conical springs 620 and thus adjust loading to a radial lead seal assembly 600.

Figure 5:
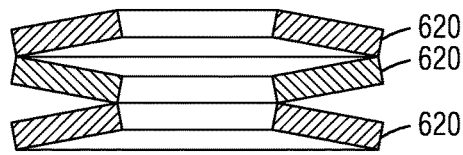
FIG. 5 illustrates a perspective view of conical springs oriented in a series configuration according to an embodiment.
Figure 6:
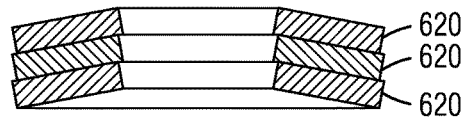
FIG. 6 illustrates a perspective view of conical springs oriented in a parallel configuration according to an embodiment.
Figure 7:
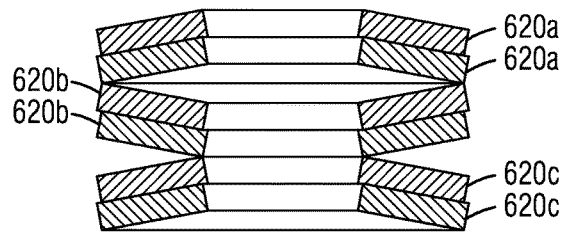
FIG. 7 illustrates a perspective view of conical springs oriented in a combination of series and parallel configurations according to an embodiment.

FIG. 5 to FIG. 7 illustrates perspective views of conical springs 620 oriented in different configurations. FIG. 5 illustrates a series orientation, showing three conical springs 620 being arranged in series. FIG. 6 illustrates a parallel configuration, showing three conical springs 620 being arranged in parallel to each other. FIG. 7 illustrates an exemplary combination of series and parallel configurations, showing three groups of conical springs 620a, 620b, and 620c arranged in series, wherein each group comprises two conical springs arranged in parallel. The number of conical springs 620 used and their orientation may be determined based on the amount of compressive loading required, and may be adjusted on the field, for example, during an outage or maintenance. In the embodiment of FIG. 3, the radial lead seal assembly 600 comprises two conical springs 620 oriented in a series configuration.

The modified configuration of a radial lead seal assembly 600 improves performance of an existing configuration of a radial lead seal assembly 500 that cannot maintain a sufficient compressive loading to the radial lead seal assembly 500 over a period of operation due to seal creep with thermal and compression set.

Furthermore, the modified configuration of a radial lead seal assembly 600 may retain a sustained loading required for sealing a radial lead 400 of a generator at both standstill and operation speed even after seal creep and compression set has occurred.

The illustrated retrofit method can be used for modifying an existing radial lead seal assembly of a generator on the field to eliminate a leakage issues without expensive and time consuming disassembly of a major rotor component.

The disclosed method and the apparatus may be implemented at different types of power generation applications, such as a nuclear power generation application.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 Rotor
200 Lead Assembly of a Generator
300 Axial Lead
320 Axial Chamber
400 Radial Lead
420 Radial Chamber
500 Existing Configuration of a Radial Lead Seal Assembly
510 Annular Sealing Elements
520 Coil Spring
530 Junction between Radial Lead and Axial Lead
540 Loading Element
550 Spacer
560 Top Washer
570 Bottom Washer
600 Modified Configuration of a Radial Lead Seal Assembly
620 Conical Spring
640 Transition Spacer
660 Annual Surface of Conical Spring

What is claimed is:

1. A retrofit method for modifying a radial lead seal assembly of a generator, wherein the generator comprises a lead assembly for conducting a field current to a rotor winding, wherein the lead assembly comprises an axial lead extending within an axial chamber through the rotor and a radial lead extending radially outward from the axial lead through a radial chamber, wherein the radial lead seal assembly fluidically seals the radial chamber from the axial chamber, wherein the radial lead seal assembly comprises a plurality of annular sealing elements disposed around the radial lead so as to seal an annular space between the radial lead and the radial chamber, a coil spring disposed annularly around the radial lead between the plurality of sealing elements and a junction between the radial lead and the axial lead, and a loading member, the retrofit method comprising:
   removing one or more of the annular sealing elements to define a radial space between the remainder of the sealing elements and the coil spring;
   inserting a plurality of conical springs in said radial space; and
   applying a radially inward compressive load on the radial lead seal assembly via the loading member such that the conical springs are only partially compressed,
   wherein a clearance from an outer diameter of the conical springs to an inner diameter of the radial chamber is smaller than a clearance from an inner diameter of the conical springs to an outer diameter of an insulation of the radial lead so that the conical springs do not contact with an insulated surface of the radial lead.

2. The retrofit method according to claim 1, wherein a transition spacer is disposed annularly around the radial lead between the coil spring and the conical springs.

3. The retrofit method according to claim 1, wherein the compressive load exerted by the loading member fully compresses the coil spring.

4. The retrofit method according to claim 1, wherein the loading member comprises a nut engaged to the radial chamber at a radially outer end of the radial lead, and wherein the compressive load is applied by exerting a torque on the nut.

5. The retrofit method according to claim 1, wherein the plurality of sealing elements are made of a material comprising neoprene rubber.

6. The retrofit method according to claim 1, wherein the conical springs are oriented in a series configuration.

7. The retrofit method according to claim 1, wherein the conical springs are oriented in a parallel configuration.

8. The retrofit method according to claim 1, wherein the conical springs are oriented in a combination of series and parallel configurations.

9. A radial lead seal assembly of a generator, wherein the generator comprises a lead assembly for conducting a field current to a rotor winding, wherein the lead assembly comprises an axial lead extending within an axial chamber through the rotor and a radial lead extending radially outward from the axial lead through a radial chamber, the radial lead seal assembly comprising:
   a plurality of annular sealing elements disposed around the radial lead to seal an annular space between the radial lead and the radial chamber and thereby seal the axial chamber fluidically from the radial chamber;
   a coil spring disposed annularly around the radial lead between the plurality of sealing elements and a junction between the radial lead and the axial lead;
   a plurality of conical springs disposed annularly around the radial lead in a radial gap between the plurality of sealing elements and the coil spring; and
   a loading member for exerting a compressive load on the radial lead seal assembly in radially inward direction such that the conical springs are only partially compressed,
   wherein a clearance from an outer diameter of the conical springs to an inner diameter of the radial chamber is smaller than a clearance from an inner diameter of the conical springs to an outer diameter of an insulation of the radial lead so that the conical springs do not contact with an insulated surface of the radial lead.

10. The radial lead seal assembly according to claim 9, further comprising a transition spacer disposed annularly around the radial lead between the coil spring and the conical springs.

11. The radial lead seal assembly according to claim 9, wherein the compressive load exerted by the loading member fully compresses the coil spring.

12. The radial lead seal assembly according to claim 9, wherein the loading member comprises a nut engaged to the radial chamber at a radially outer end of the radial lead, and wherein the compressive load is applied by exerting a torque on the nut.

13. The radial lead seal assembly according to claim 9, wherein the plurality of sealing elements are made of a material comprising neoprene rubber.

14. The radial lead seal assembly according to claim 9, wherein the conical springs are oriented in a series configuration.

15. The radial lead seal assembly according to claim 9, wherein the conical springs are oriented in a parallel configuration.

16. The radial lead seal assembly according to claim 9, wherein the conical springs are oriented in a combination of series and parallel configurations.

\* \* \* \* \*